C. E. WOODROW.
EGG SEPARATOR.
APPLICATION FILED MAY 21, 1910.

968,910.

Patented Aug. 30, 1910.

Witnesses
N. Barnes
E. Peterson

Cora E. Woodrow
Inventor
By her Attorney
Pierre Barnes

UNITED STATES PATENT OFFICE.

CORA E. WOODROW, OF SEATTLE, WASHINGTON.

EGG-SEPARATOR.

968,910.  Specification of Letters Patent.  Patented Aug. 30, 1910.

Application filed May 21, 1910. Serial No. 562,733.

*To all whom it may concern:*

Be it known that I, CORA E. WOODROW, a citizen of the United States, residing at Seattle, in the county of King and State of Washington, have invented certain new and useful Improvements in Egg-Separators, of which the following is a specification.

The object of my invention is the provision of an inexpensive and conveniently operated device which is utilized for separating the albumen of an egg from the yolk.

The invention, generally stated, consists in a bowl-shaped vessel having an opening in its peripheral wall and provided with a peculiarly formed lip which protrudes from the vessel at the lower edge of said opening, as will be hereinafter more particularly described and claimed.

Figure 1:
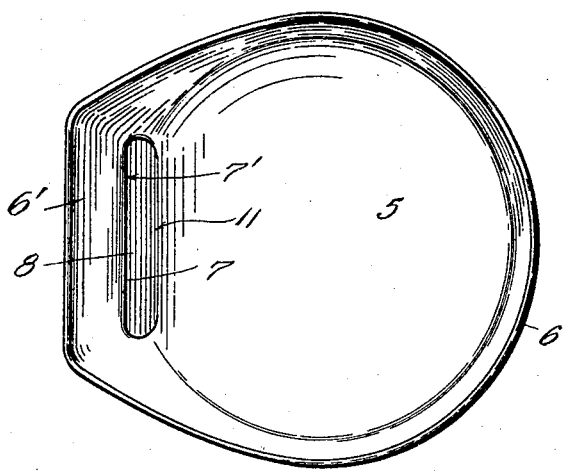
Figure 2:
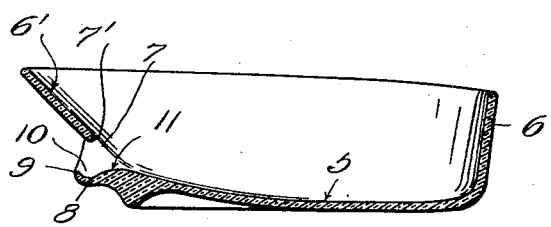

In the accompanying drawings, Figure 1 is a plan view of an egg-separator embodying my invention; and Fig. 2 is a longitudinal vertical section of the same.

In carrying out my invention, I employ a shallow vessel provided with a concave bottom 5 and a wall 6 about its periphery. The forward side of said wall is desirably formed with an outwardly sloping flat part 6'. At the base of the wall part 6' is a slot 7 whose underside is coextensive with the vessel bottom and likewise with the upper surface of a lip 8 which protrudes for a distance to the front of said slot. Adjacent to the outer edge, or brim, 9 of the lip is a depression, or trough, 10 and connecting the latter with the vessel bottom 5 is a convex ridge 11.

In operation, the contents of an egg is placed in the vessel and, after shaking the vessel to a slight extent according to the freshness of the egg for the purpose of lessening the adhesion of the yolk to the albumen, the rear end of the vessel is tilted upwardly to enable the egg to flow to the front end of the vessel's bottom. A further tilting of the vessel will cause the white of the egg to flow over the corrugation 11 afforded by the upper surface of the lip and into the depression 10 and thence escape over the brim 9 into a receptacle (not shown). The egg albumen, as it is discharged from the orifice 7 and flows into and over the depression 10, creates a slight degree of suction upon the matter remaining, which causes all the albumen to draw off quickly through the slot while the suction is not sufficient to damage the delicate skin of the yolk. The yolk is obstructed from passage through the slot by encountering the upper edge 7' of the latter and thus the separation of the egg parts is effected.

What I claim as my invention, is—

An egg separator consisting of a shallow vessel having a straight slot in its peripheral wall, a lip having a longitudinal depression therein extending forwardly from and coextensive with said opening.

CORA E. WOODROW.

Witnesses:
  H. BARNES,
  E. PETERSON.